United States Patent Office 3,315,982
Patented Apr. 25, 1967

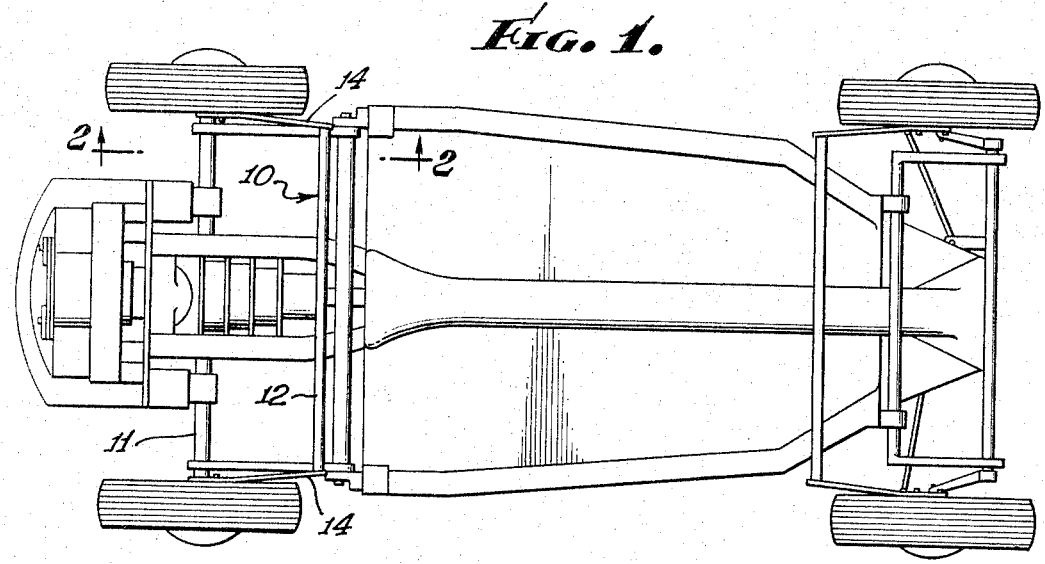
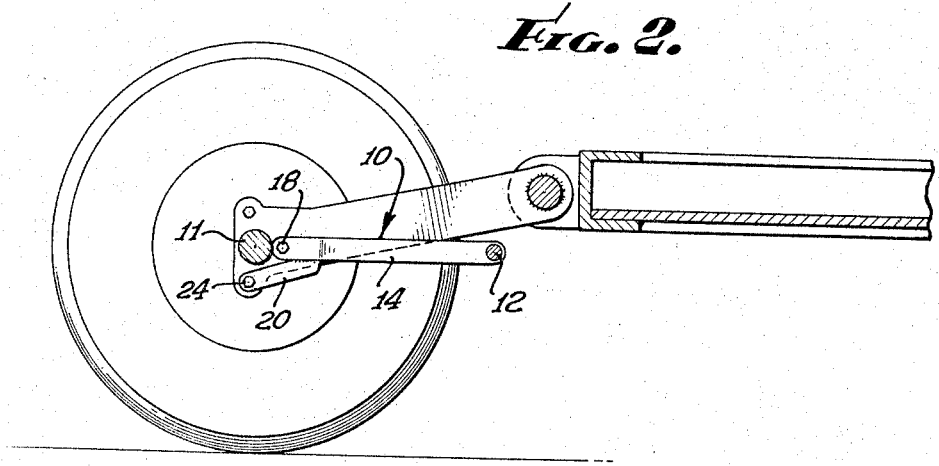
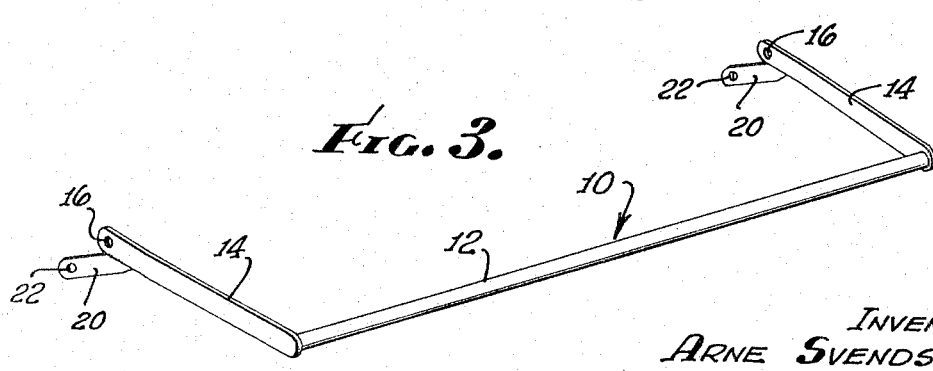

3,315,982
FLOATING STABILIZER FOR WHEELED VEHICLES
Arne Svendsen, 1145 Hastings Ranch Drive, Pasadena, Calif. 91107
Filed Aug. 30, 1965, Ser. No. 483,516
1 Claim. (Cl. 280—124)

This invention relates to improvements in stabilizer devices for minimizing or preventing the swaying of vehicles having one or more wheels in independent suspension. Hitherto, other existing devices for reducing such swaying have disadvantages of needing many parts in their construction and of being relatively expensive to manufacture and to install in a vehicle.

Such existing devices have further disadvantages of causing an increase in the spring load of a conventional suspension and of lacking flexibility of installation either in front or in back of either the front or rear axle of a vehicle. Frequently, such existing devices produce substantial noise in their operation such as squeaks, rattles, or similar annoying noises.

It is, therefore, an object of this invention to provide a stabilizer for vehicles which will minimize swaying of a vehicle having an independent suspension.

Another object of this invention is to provide a stabilizer which may be easily installed in any vehicle having an independent suspension.

A further object of this invention is to provide a stabilizer for vehicles which has relatively few parts and is easy to manufacture at a low cost.

A still further object of this invention is to provide a stabilizer for vehicles which produces no noise such as rattles, squeaks, and the like, while in use.

A still further object of this invention is to provide a stabilizer for vehicles which avoids any interference with the mechanical operation of the vehicle in which it is installed.

A still further object of this invention is to provide a stabilizer for vehicles that is capable of being installed either in front or in back of either the front or rear axle of a vehicle having wheels in independent suspension.

These and other objects will be more readily understood by reference to the following description and claim, taken in conjunction with the accompanying drawing forming a part hereof, in which FIGURE 1 is a bottom plan view of my invention showing its installation in a Volkswagen automobile.

FIGURE 2 is a section taken along line 2—2 of FIGURE 1.

FIGURE 3 is a perspective view of the stabilizer.

With respect to the drawing, the stabilizer 10 is shown in FIGURE 1 installed in front of the rear axle 11 of the Volkswagen automobile. The stabilizer 10 has a torsion bar 12 which may be a hollow tube or of solid construction as desired, although a hollow tube is preferable because of its light weight.

Each end of the torsion bar 12 is rigidly joined by any suitable means such as welding, splining, bolting, and the like, at right angles to a trailing arm 14. Each trailing arm 14 has a hole 16 at its outer end to receive a bolt 18 to secure the stabilizer to the vehicle's suspension near the axle, as illustrated in FIGURE 2.

The trailing arms 14 have a slight inward taper toward the torsion bar 12 to avoid any interference with the suspension of the vehicle.

To provide additional stability, a short trailing arm 20 is rigidly joined to the outer end portion of each trailing arm 14 by any suitable means such as welding, splining, bolting and the like. Each short trailing arm 20 has a hole 22 at its outer end to receive a bolt 24 to help secure the stabilizer 10 to the vehicle suspension near the axle, as illustrated in FIGURE 2.

Each short trailing arm 20 is in the same plane as the long trailing arm 14 to which it is joined, and forms an angle of about 30 degrees, which may vary 2 degrees more or less, with the trailing arm 14.

The trailing arms 14 and the short trailing arms 20 may be made in one piece as well as two pieces. Any suitable material may be used that has the requisite strength and resilience. A preferable material is a cold rolled steel having the qualities of a mild spring steel.

The location of the shorter trailing arms 20 should be as close to the outer end of the trailing arms 14 as possible for maximum effectiveness of the stabilizer. Further, the trailing arms 14 should be as long as possible to obtain maximum takeup of the pendulum movement of the axle.

In operation after the stabilizer has been installed in a vehicle as illustrated in FIGURES 1 and 2 of the drawings, the stabilizer follows the movement of either wheel connected to the axle near which the stabilizer is attached. As the wheel starts to rise or fall due to cornering, crosswinds, curves, bumps or depressions in the road, the stabilizer produces a torque reaction so that the other wheel connected to the axle substantially follows the movement of the first wheel.

Accordingly, a vehicle equipped with the stabilizer is substantially free from swaying, and has a corresponding improvement in driving safety. Also, because spring elements are absent in the invention, no spring loading occurs on conventional vehicle suspensions.

Although I have described my invention in detail with reference to certain preferred embodiments, it is understood that numerous changes and modifications may be made in the arrangement and construction of elements without departing from the spirit and scope of the invention as claimed hereinafter.

I claim:

A stabilizer for a vehicle having a frame, ground wheels on opposite sides of said frame, and suspension means independently suspending said wheels from said frame and upon which said wheels are journalled on a transverse wheel axis: said stabilizer comprising a torsion member formed in the shape of a straight bar and extending laterally of said frame spaced from said axis; means supporting said torsion member and consisting of a rigid arm rigidly attached to each end of said torsion member, said arms extending transverse to and substantially at right angles to said torsion member and generally toward said axis and terminating in outer end portions each rigidly secured to adjacent suspension means near said axis at at least two vertically spaced points whereby said rigid arms comprise the sole support for said torsion member, and operate in the absence of any twisting motion.

References Cited by the Examiner

UNITED STATES PATENTS

| | | | |
|---|---|---|---|
| 3,054,625 | 9/1962 | Haley | 280—124 |
| 3,181,885 | 5/1965 | Baracos et al. | 267—57 |
| 3,194,336 | 7/1965 | Mc Henry | 180—73 |
| 3,195,670 | 7/1965 | Dunn | 280—124 X |
| 3,218,053 | 11/1965 | Shreve | 280—124 |

BENJAMIN HERSH, *Primary Examiner.*

M. SALES, T. GOODMAN, *Assistant Examiners.*